Nov. 29, 1966 — R. W. MACY II — 3,287,800
PISTON RING TOOL SET
Filed June 1, 1964

INVENTOR
Robert W. Macy II

BY *Justan Miller*
ATTORNEY

United States Patent Office 3,287,800
Patented Nov. 29, 1966

3,287,800
PISTON RING TOOL SET
Robert W. Macy II, Specialties Co., P.O. Box 748,
Newcastle, Wyo.
Filed June 1, 1964, Ser. No. 371,439
3 Claims. (Cl. 29—222)

This invention relates to a piston ring tool used as a set consisting of a mirror image pair of tools for expanding a piston ring with substantially no distortion thereof in temporarily enlarging the circumference of the piston ring so that it may be placed down over a piston and installed in its respective ring land, and which may also be used in removing a piston ring from its land and from the piston.

A further object of this invention is to provide a piston ring tool set consisting of a pair of right and left hand, or mirror image, tools for use in a novel process of enlarging the piston ring circumference without bending the ring solely at the point 180° from the ring ends and without distorting the ring when being installed.

Still a further object of this invention is to provide a process of installing a piston ring on a piston by temporarily enlarging the circumference of the ring by applying pulling pressure at the ring ends to pull the ends apart, and simultaneously applying counterpressure on the ring portions approximately 90° from the ring ends, while applying a counterbalancing pressure on at least one point between said counterpressure 90° points and the piston ring ends.

Still a further object of this invention is to provide a single piece piston ring tool which is used in mirror image pairs.

Yet a further object of this invention is to provide a piston ring one piece tool consisting of a one piece elongate lightweight strap, preferably of metal, having a thumb pad receiving aperture at one end and a piston ring end receiving aperture at the other end.

A still further object of this invention is to provide a piston ring elongate strap tool having a thumb pad tab adjustably extending out of the end side of a thumb receiving aperture at one end of the strap and a piston ring end engaging lug extending out of the end side of a piston ring end receiving aperture at the other end of the strap, and preferably, where the piston ring receiving end portion of the strap is at a slight angle to the remaining elongate portion of the strap, with the piston ring end engaging lug extending transversely at a right angle of the elongate axis and the thumb pad tab extending transversely at an acute angle of the elongate axis, with both tab and lug struck in the same direction from the strap.

A further object of this invention is to leave the finger ends free when not engaged in the process of installing or removing the piston ring, so that they can be used for other purposes, such as opening a box or unwrapping a new ring, without disengaging the tools from the thumbs.

With the above and related objects in view, this invention consists in the details of construction and combination of parts, as will be more fully understood from the following description, when read in conjunction with the accompanying drawings in which.

Figure 1:
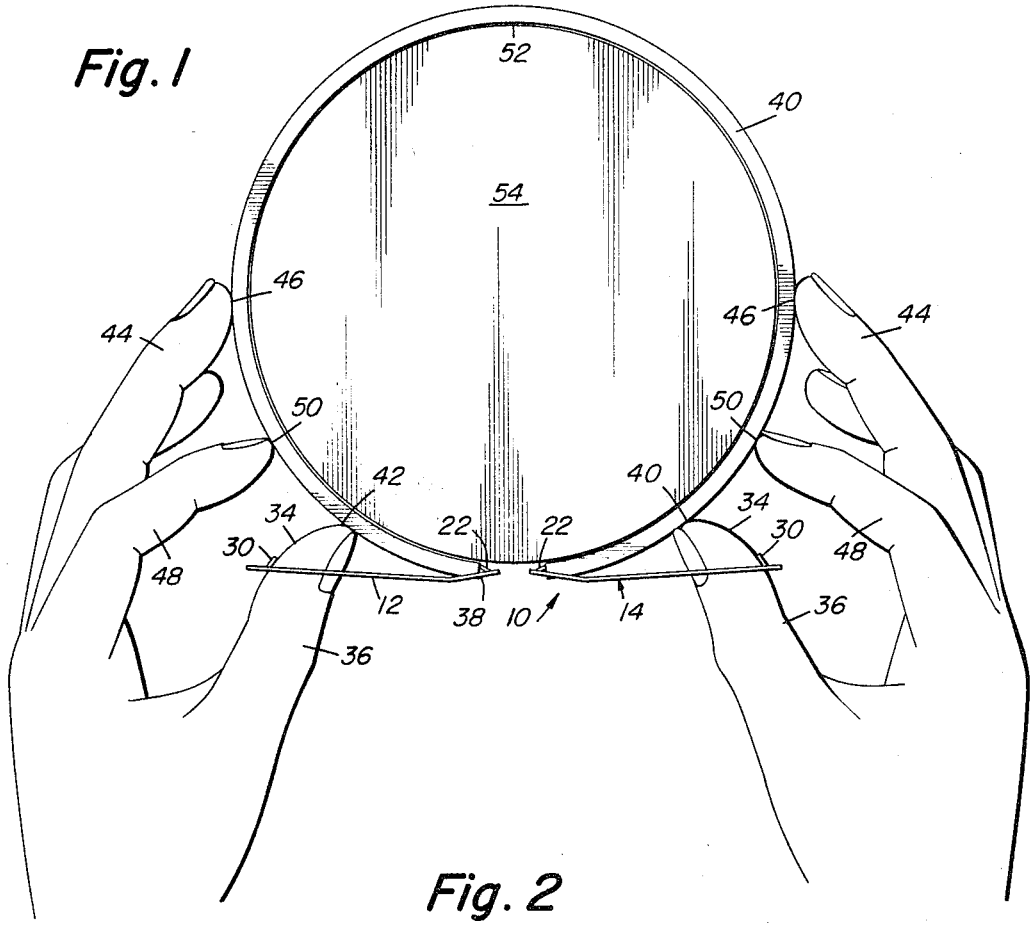
FIG. 1 is a top plan view of the invention in operative position.
Figure 2:
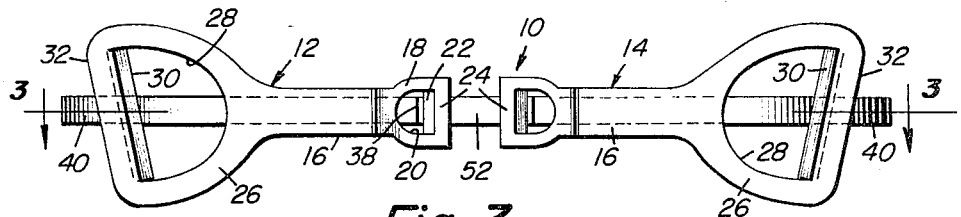
FIG. 2 is an elevational view on an enlarged scale.
Figure 3:
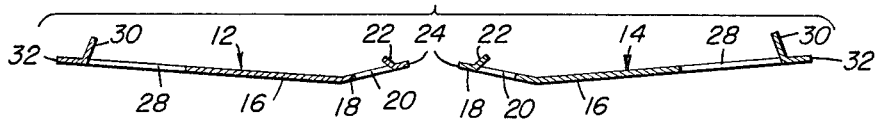
FIG. 3 is a sectional view on line 3—3 of FIG. 2.

There is shown at 10 the piston ring tool set of this invention consisting of a pair of one piece left and right hand separate tools 12 and 14, each of which is a mirror image of the other. Each tool 12 and 14 consists of an elongate strap 16 having a slightly enlarged piston ring end receiving apertured portion 18 at one end extending at a slight angle to the plane of the remaining portion of the strap 16. In this portion 18 there is provided a piston ring end receiving aperture 20 having a ring end engaging lug 22 struck out therefrom on the end side 24 thereof, a part of the material struck out from the aperture 20 having been discarded, and the struck out lug 22 extending transversely at right angles to the axis of the elongate strap 16.

At the other end of the elongate strap 16 there is provided a much more enlarged portion 26 in which is located a thumb receiving aperture 28 having a struck out tab 30 extending across the end side 32 thereof, a part of the material struck out from the aperture 28 having been likewise discarded. The material of the tool is slightly flexible, hence the tab 30 may be bent more or less to be more comfortable to the thumb pad portion 34 of the thumb 36.

In operation the ring ends 38 are pried apart and the tools 12 and 14 are placed with their piston ring end apertures 20 extending over the piston ring ends 38, the ring ends being engaged by the lugs 22 and extending into the apertures 20, with the slightly angled end portions 18 extending toward the piston ring 40, the thumb pad receiving apertured portions 26 extending away from each other, and the left thumb 36 is extended through aperture 28 of the left hand tool 12, while the right thumb 36 is extended through aperture 28 of the right hand tool 14 until the thumb pads 34 rest comfortably on the tabs 30 and the thumb ends 42 rest against the outer surface of the piston ring so that the thumbs 36 may apply a pulling pressure on the ring ends 38 in a direction away from each other.

Meantime, the middle fingers 44 simultaneously apply a light counterpressure against the points 46 approximately 90° from the piston ring ends 38, and the forefingers 48 apply a balancing pressure against points 50 somewhere between the thumb ends 42 and the 90° points 46. This counterpressure at the 90° points 46 prevents all bending pressure from taking place solely at the 180° point 52, and instead, some of the bending takes place at the 90° points 46. This prevents distortion of the piston ring 40 as it is being installed, and permits it to return to a true complete and closed circle in its land in the piston 54. It will be noted that with the usual piston tools, pulling pressure is applied only on the piston ring ends, without it being possible for the other fingers to apply any counterpressure at the 90° points and hence ring 40 is bent and distorted at the 180° point 52 where all the bending is concentrated, and hence the ring ends 38 do not return to an abutting closed position when in the piston land.

To remove a worn ring the ring ends 38 are pried apart enough to place them in the apertures 20 against the lugs 22, and then the same pulling pressure and counterpressure is applied and the piston ring 40 is readily removed from the land in the piston 54 and then over the top of the piston 54.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A piston tool ring set comprising a mirror image pair of tools, each tool being of one piece construction, each piece comprising a substantially straight elongate strap having a piston ring end engaging end bent at a slight angle thereto, said bent end having an aperture therein of greater width than the width of the piston ring end to be engaged, a struck-out portion, of less length than the length of the aperture, extending at an angle rearwardly away from said bent end at the end portion of said aperture to engage the piston ring end when said aperture of said bent end is engaged over the piston ring end, said strap having a thumb receiving aperture at the other end of said straight elongate portion, said struck-out portion extending normal to the axis of said elongate strap.

2. The tool of claim 1, and a thumb pad tab provided by at least a portion of the material struck out in providing said thumb receiving aperture, said struck out tab extending at an acute angle transversely of the axis of said straight portion of said elongate strap.

3. The tool of claim 2, the thumb receiving aperture end of said strap being substantially wider than the piston ring end receiving apertured bent end thereof.

References Cited by the Examiner

UNITED STATES PATENTS

| | | | |
|---|---|---|---|
| 1,241,835 | 10/1917 | Dunham | 29—156.61 |
| 1,337,600 | 4/1920 | Hammontree et al. | 29—222 |
| 1,405,332 | 1/1922 | Reid | 29—156.61 |
| 1,444,981 | 2/1923 | Nelson | 29—222 |
| 1,983,965 | 12/1934 | Berkman | 29—222 |
| 2,444,975 | 7/1948 | Bramberry | 29—222 |
| 2,465,427 | 3/1949 | Bramberry | 29—222 |

WILLIAM FELDMAN, *Primary Examiner.*

J. C. PETERS, *Assistant Examiner.*